106. COMPOSITIONS, COATING OR PLASTIC.

Patented Sept. 7, 1926.

1,598,636

UNITED STATES PATENT OFFICE.

FRANCIS A. BARTLETT, OF STAMFORD, CONNECTICUT.

FIBROUS COMPOSITION OF MATTER.

No Drawing.  Application filed June 22, 1920.  Serial No. 390,780.

This invention relates to compositions of matter, and has for an object the provision of a composition which is suitable for the filling of cavities in trees, for insulating material, or for floors and other purposes.

Another object of this invention is to provide a filling material for trees which will be light in weight, flexible, adhesive, quick setting, fireproof, and strong.

For many years concrete made of Portland cement, sand, and gravel has been used in tree surgery for the filling of cavities. This material has several serious drawbacks in that it is nonflexible and brittle so that it must be put into the cavity in sections; it is not adhesive so that an air space is formed between the fillings and the wood of the tree, making possible the entrance of moisture, which in turn causes decay. It cannot be applied in cold weather as it will freeze and spoil its setting qualities, and its weight under many conditions is objectionable.

My improved composition consists of a filler such as sawdust, wood flour or ground cork, or other finely divided vegetable matter; a fiber such as asbestos, hair, or other fibrous material; a base such as Portland cement, sand or other cheap material; a preservative such as asphalt, coal tar, oil or the like; a binder preferably of water glass having the consistency of molasses; water-proofing consisting of a coating of asphalt and asbestos put on over the surface of the composition after same has hardened in the cavity; and re-enforcing consisting of iron rods, bolts, wire, rope, or other material (used only in large cavities).

The composition more or less specifically consists of sawdust, 4 to 16 parts; asbestos, 1 part; Portland cement, (a small quantity); asphalt or tar, (sufficient to thoroughly saturate and coat all the particles of the filler and the fibrous material); water glass, (sufficient to make the composition into a plastic, sticky mass which can be worked readily but will hold its shape). All of the ingredients excepting the water glass may be mixed up dry and cold in any order, and the water glass is mixed with the composition immediately before applying same.

The fiber in the composition adds to the tensile strength, flexibility, endurance, and fire-proof qualities of the composition. The Portland cement or sand gives the composition more body, makes it homogeneous in texture, and provides a better surface, while the asphalt, coal tar, etc., not only serve as a preservative, but also adds to the adhesive and elastic qualities. The water glass acts as a binder to hold the ingredients together and also sets quickly making a firm, hard, glass-like surface on the composition. The Portland cement, sand, asphalt, and asbestos coating, and re-enforcing may be eliminated from the composition without seriously reducing its valuable qualities. The fibrous material can be eliminated at a sacrifice of considerable tensile strength, flexibility, and endurance.

My composition is essentially valuable in tree surgery for filling cavities in trees, in which use it is flexible, strong, hard, water proof, and serves as a preservative for the tree to prevent decay. It is also valuable for use as a flooring in dairy farms in place of cork, and may be used to advantage for making heat insulating, sound proof and fire proof partitions, and for other uses.

While the composition described represents a practical embodiment of my invention, I do not limit myself precisely to the details described, since manifestly the same can be considerably varied without departing from the spirit of the invention as defined in the appended claims.

Having thus described my invention, I claim as new and desire to secure by Letters Patent:

1. A flexible plastic composition of matter which contains finely divided cellulosic matter, non-vegetable fibrous material, Portland cement, sand, a preservative, and water glass.

2. A flexible plastic composition of matter which contains sawdust, asbestos, Portland cement, asphalt, and water glass.

3. A flexible plastic composition of matter which contains sawdust, asbestos, Portland cement, bituminous matter, and water glass.

FRANCIS A. BARTLETT.